United States Patent Office 3,474,068
Patented Oct. 21, 1969

3,474,068
ULTRAVIOLET LIGHT STABILIZERS FOR POLYOLEFINS AND POLYURETHANES
Keisuke Murayama, Syoji Morimura, Saburo Akagi, Tomoyuki Kurumada, and Ichiro Watanabe, Tokyo, Atsushi Kitaoka, Nobeoka, and Isamu Suzuki and Jukichi Ohmura, Fuji, Japan, assignors to Sankyo Company Limited, Tokyo, and Asahi Kasei Kogyo Kabushiki Kaisha, Osaka, Osaka Prefecture, Japan
No Drawing. Filed Sept. 15, 1967, Ser. No. 668,204
Claims priority, application Japan, Sept. 19, 1966, 41/66,825; Apr. 17, 1967, 42/24,345
Int. Cl. C08f *45/60;* C08g *51/60*
U.S. Cl. 260—45.8                                 5 Claims

ABSTRACT OF THE DISCLOSURE

Resinous polymers, particularly polyolefins and polyurethanes are stabilized against photo-deterioration by having incorporated therein at least one compound selected from the 7,7-dimethyl-9,9-disubstituted-piperidine-spiro-hydantoin-8-oxyls in a sufficient amount to prevent such deterioration.

---

This invention relates to the stabilization of resinous polymers. More particularly, it relates to the stabilization of resinous polymers against photo-deterioration by incorporating therein an effective amount of the piperidine-N-oxyl-spiro-hydantoin having the formula

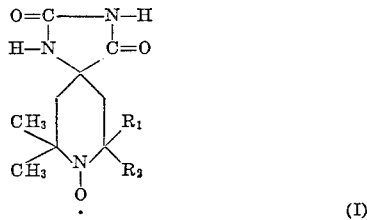

(I)

wherein $R_1$ and $R_2$ may be the same or different and represent alkyl group or they may be joined together with the carbon atom to which they are attached to form a 5- or 6-membered saturated homocyclic ring or the group of the formula

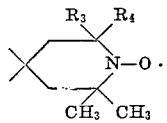

(wherein $R_3$ and $R_4$ may be the same or different and represent alkyl group). This invention also relates to the resinous polymers thus stabilized.

The term "resinous polymer" herein used means to include polyolefins such as high and low pressure polyethylenes, polypropylene, polybutadiene, polyisoprene, polystyrene and the like; olefin copolymers such as ethylene-propylene copolymers, styrene-butadiene copolymers, acrylonitrile-butadiene-styrene copolymers; polyurethanes; and the like, and these resinous polymers may be of any shape or form, for example, including filament, fiber, film, sheet, other shaped article, latex, foam and the like.

The resinous polymers frequently tend to undergo photo-deterioration when exposed outdoor or indoors to light such as sunlight or ultraviolet light. There have been heretofore proposed various types of stabilizers for the protection of these resinous polymers against such photo-deterioration. For instance, a great number of light stabilizers have been suggested in the art for the purpose of stabilizing the resinous polymers, for example, polyolefins and polyurethanes against such photo-deterioration. Especially, there are favourably recommended as light stabilizers such compounds as 2-(2-hydrovy5'-methyl-phenyl)-benzotriazone; 2-hydroxy-4-n-octoxybenzophenone, 1,1-bis(2-methyl-4-hydroxy-5-tert.-butyl phenyl)-n-butane and the like. Although these prior art light stabilizers are widely employed in the art, various attempts are being made in the art in order to develop more favourable light stabilizers.

As a result of our extensive investigations on light stabilizers, it has been unexpectedly found that the above-specified piperidine-N-oxyl-spiro-hydantoins of the Formula I exhibit an exceptionally high degree of stabilizing action on the resinous polymers against photo-deterioration thereof and also that they show little thermal sublimation and no appreciable coloring action on the resinous polymers.

It is, therefore, a primary object of this invention to provide a novel class of light stabilizers for the resinous polymers against photo-deterioration.

Another object is to provide the resinous polymers stabilized against photo-deterioration by incorporating therein an effective amount of the piperidine-N-oxyl-spiro-hydantoins of the Formula I.

Still another object of this invention is to provide a method for the stabilization of the resinous polymer against photo-deterioration which comprises incorporating in the said polymer an effective amount of the piperidine-N-oxyl-spiro-hydantoins of the Formula I.

The piperidine-N-oxyl-spiro - hydantoins of the above Formula I are novel compounds unknown in the prior art. These piperidine-N-oxyl-spiro-hydantoins can be readily and advantageously prepared (a) by treating the piperidine-spiro-hydantoin compound having the formula

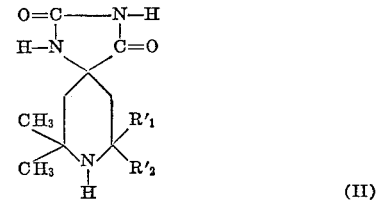

(II)

wherein $R'_1$ and $R'_2$ may be the same or different and represent alkyl group or they may be joined together with the carbon atom to which they are attached to form a 5- or 6-membered saturated homocyclic ring or the group of the formula

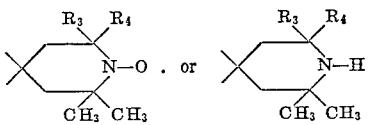

(wherein $R_3$ and $R_4$ are as defined above) with a peroxide or (b) by reacting the piperidine-N-oxyl compound having the formula

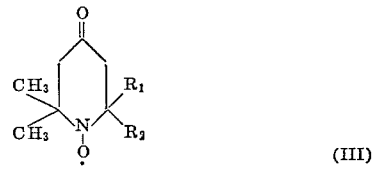

(III)

wherein $R_1$ and $R_2$ are as defined above with an alkali metal cyanide and ammonium carbonate.

In the above Formula I, the groups $R_1$ and $R_2$ individually may be illustrated by the following groups; namely, methyl, ethyl, n-propyl, isopropyl, n-butyl, iso-butyl, hexyl, octyl, decyl and dodecyl. The cyclic groups which may be formed by the groups $R_1$ and $R_2$ may be illustrated by those groups shown below:

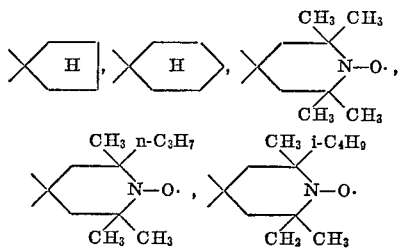

Representative examples of the piperidine-N-oxyl-spiro-hydantoins I which may be employed in this invention include the following hydantoins:

1,3,8-triaza-7,7,9,9-tetramethyl-2,4-dioxo-spiro[4.5] decane-8-oxyl;
cyclohexane-1-spiro-2'-(6',6'-dimethylpiperidine-1'-oxyl)-4'-spiro-5''-hydantoin;
(2,2,6,6-tetramethylpiperidine-1-oxyl)-4-spiro-2'-(6',6'-dimethylpiperidine-1-oxyl)4'-spiro-5''-hydantoin;
1,3,8-triaza-7,9,9-trimethyl-7-n-hexyl-2,4-dioxo-spiro [4.5]decane-8-oxyl;
1,3,8-triaza-7,9,9-trimethyl-7-isobutyl-2,4-dioxo-spiro [4.5]decane-8-oxyl;
1,3,8-triaza-7,7-diisobutyl-9,9-dimethyl-2,4-dioxo-spiro [4.5]decane-8-oxyl; and
cyclopentane-1-spiro-2'-(6'-6'-dimethylpiperidine-1'-oxyl)-4'-spiro-5'-hydantoin.

For the purpose of illustrating the preparation of the piperidine-N-oxyl-spiro-hydantoins I as explained above, some specific embodiments of the preparation of such hydantoins are given below, this disclosure being incorporated herein solely as a reference.

PREPARATION 1

Preparation of 1,3,8-triaza-7,7,9,9-tetramethyl-2,4-dioxo-spiro[4.5]decane-8-oxyl To a solution of 20 g. of 1,3,8-triaza-7,7,9,9-tetramethyl-2,4-dioxo-spiro[4.5]decane in 80 ml. of acetic acid was added 0.5 g. of ethylenediaminetetraacetic acid, 0.4 g. of sodium tungstate and then 40 ml. of 30% hydrogen peroxide. The resulting mixture was stirred at room temperature for 7 days. Then, the reaction mixture was concentrated under reduced pressure, and to the residue thus obtained was added a saturated aqueous solution of potassium carbonate and then the resulting mixture was stirred at room temperature for 1 hour. Thereafter, the crystalline substance precipitated was recovered by filtration, washed with water, and then recrystallized from aqueous ethanol to give the desired product melting at 331° C. (decomp.).

Analysis.—Calculated for $C_{11}H_{18}O_3N_3$: C, 54.98; H, 7.55; N, 17.49. Found: C, 55.19; H, 7.67; N, 17.45.

The electron spin resonance spectrum (in tetrahydrofuran) of the product thus obtained showed a strong triplet of a hyperfine coupling constant 15.3 oe., which triplet would be given by the splitting due to the interaction of the unpaired electron spin with nuclear spin of the N atom in the piperidine ring. This result evidently demonstrates the presence of a stable N-oxyl free radical in the product.

PREPARATION 2

Preparation of cyclohexane-1-spiro-2'-(6',6'-dimethyl-piperidine-1'-oxyl)-4'-spiro-5''-hydantoin A solution of 1.1 g. of 1-aza-2,2-dimethyl-4-oxo-spiro [5.5]undecane-1-oxyl, 0.4 g. of sodium cyanide and 2.5 g. of ammonium carbonate in 20 ml. of 50% aqueous ethanol was stirred at 50–60° C. for 7 hours. Then, the reaction mixture was ice-cooled and the crystalline substance precipitated was recovered by filtration, washed with water and then recrystallized from aqueous ethanol to give the desired product melting at 282–283.5° C.

Analysis.—Calculated for $C_{14}H_{22}O_3N_3$: C, 59.98; H, 7.91; N, 14.99. Found: C, 59.79; H, 7.82; N, 15.18.

Where the piperidine-N-oxyl-spiro-hydantoins of the above Formula I are to be employed in the resinous polymer for the purpose of stabilization, they may be readily incorporated into the resinous polymer by various standard procedures commonly utilized in the art. The stabilizer hydantoins in this invention may be incorporated into the resinous polymers at any desired stage prior to the manufacture of shaped articles. For example, the dry stabilizer in a form of powder may be admixed with the resinous polymer or a suspension or emulsion of the resinous polymer may be admixed with a suspension or emulsion of the stabilizer of this invention.

The amount of the piperidine-N-oxy-spiro-hydantoins to be employed in the resinous polymer in accordance with this invention may be widely varied, depending upon the types, properties and particular uses of the resinous polymer and other factors. For instance, where polyolefin is to be stabilized against photo-deterioration, the stabilizer of this invention is usually and preferably employed in the range of concentrations of about 0.01–2.0% by weight and more preferably of about 0.05–0.2% by weight, these concentrations being based upon the weight of the polyolefin employed. Where polyurethane is to be stabilized against photo-deterioration, the stabilizer of this invention is usually and preferably employed in the range of concentrations of about 0.01–10% by weight and more preferably of about 0.05–5% by weight, these concentrations being based upon the weight of the polyurethane employed.

The piperidine-N-oxyl-spiro-hydantoins (I) of this invention may be optionally and advantageously employed alone or in combination with other additives, such as other known stabilizers (including, for example, antioxidants and ultraviolet absorbants), fillers, pigments and the like. If necessary, an optional combination of two or more piperidine-N-oxyl-spiro-hydantoins (I) may be satisfactorily employed in this invention to obtain the better results.

The following examples are given solely for the purpose of illustrating the excellent light stability of the piperidine-N-oxyl-spiro-hydantoins (I) in the resinous polymer in accordance with this invention. In these examples, all parts are given by weight unless otherwise stated.

EXAMPLE 1

In a mortar, with 100 parts of polypropylene was intimately admixed 0.25 part of the piperidine-N-oxyl-spiro-hydantoin of this invention specified in the following Table I.

The resulting mixture was preheated to 215° C. under a pressure of 10 kg./cm.$^2$ for 2 minutes and then compressioned-molded into a sheet of 0.5 mm. thick at 215° C. under a pressure of 150 kg./cm.$^2$ for 0.5 minute.

As a control for comparative purpose, the polypropylene sheets were prepared by repeating the same procedure as described above except that the commercially available stabilizer shown in the following Table I was employed instead of the stabilizer of this invention or any kind of stabilizers was not used.

Thereafter, all of these sheets thus prepared were tested for the "brittleness time" (which term means the time, expressed in terms of hour, until the test sheet will become brittle) under ultraviolet irradiation at 45° C. by means of the fademeter prescribed in the JIS-L-1044-3-8.

The test results are summarized in the following Table I.

TABLE I

| Stabilizer | Brittleness time (hours) |
|---|---|
| Piperidine-N-oxyl-spiro-hydantoin of this invention: | |
| 1,3,8-triaza-7,7,9,9-tetramethyl-2,4-dioxo-spiro[4.5]decane-8-oxyl | 400 |
| Cyclohexane-1-spiro-2'-(6',6'-dimethylpiperidine-1'-oxyl)-4'-spiro-5"-hydantoin | 360 |
| (2,2,6,6-tetramethylpiperidine-1-oxyl)-4-spiro-2'-(6',6'-dimethylpiperidine-1-oxyl)-4'-spiro-5"hydantoin | 440 |
| Commercially available stabilizer: | |
| 2-(2'-hydroxy-5'-methyl-phenyl)-benzotriazole | 80 |
| 2,2',dihydroxy-3,3'-di-tert.-butyl-5,5'-diemthyldiphenyl-methane | 100 |
| None | 40 |

EXAMPLE 2

A polymer stock composed of 100 parts of polypropylene and 0.25 part of the piperidine-N-oxyl-spiro-hydantoin of this invention specified in the following Table II was intimately admixed and then molten-extruded and granulated by means of a standard extruder fitted with a mixing type screw of 25 mm. diameter.

The polymer stock thus obtain was preheated to 200° C. under a pressure of 10 kg./cm.$^2$ for 5 minutes and then compression-molded into a sheet of 0.5 mm. thick at 200° C. under a pressure of 200 kg./cm.$^2$ for 2 minutes. The sheet thus formed was then quenched by dipping in water at 20° C.

As a control for comparative purpose, the polypropylene sheets were prepared by repeating the same procedure as described above, except that the commercially available stabilizer shown in the following Table II was employed instead of the stabilizer of this invention or any kind of stabilizers was not used.

Then, all of these sheets thus formed were tested for the "brittleness time" by employing the same procedure and condition as described in the above Example 1.

The test results are summarized in the following Table II.

TABLE II

| Stabilizer | Brittleness time |
|---|---|
| Piperidine-N-oxyl-spiro-hydantoin of this invention: | |
| 1,3,8-triaza-7,7,9,9-tetramethyl-2,4-dioxo-spiro[4.5]decane-8-oxyl. | Brittleness was not observed after 920 hours. |
| (2,2,6,6-tetramethylpiperidine-1-oxyl)-4-spiro-2'-(6',6'-dimethylpiperidine-1-oxyl)-4'-spiro-5"-hydantoin. | Brittleness was not observed after 940 hours. |
| Commercially available stabilizer: 1,1-bis(2-methyl 4-hydroxy-5-tert.-butylphenyl)-n-butane. | 160 hours. |
| None | 60 hours. |

EXAMPLE 3

An intimate polymer stock mixture composed of 100 parts of high density polyethylene having a density of 0.958 and a melt index of 2 and 0.25 part of the piperidine-N-oxyl-spiro-hydantoin of this invention specified in the following Table III was molten-extruded and granulated by means of a standard extruder fitted with a mixing type screw of 25 mm. diameter.

The polymer stock mixture thus obtained was preheated to 180° C. under a pressure of 10 kg./cm.$^2$ for 5 minutes and then compression-molded into a sheet of 0.5 mm. thick at 180° C. under a pressure of 200 kg./cm.$^2$ for 2 minutes.

As a control for comparative purpose, the polyethylene sheets were prepared by repeating the same procedure as described above except that the commercially available stabilizer shown in the following Table III was employed instead of the stabilizer of this invention or any kind of stabilizers was not used.

Then, all of these sheets thus formed were tested for the "brittleness time" by employing the same procedure and condition as described in the above Example 1.

The test results are summarized in the following Table III.

TABLE III

| Stabilizer | Brittleness time (hours) |
|---|---|
| Piperidine-N-oxyl-spiro-hydantoin of this invention: | |
| 1,3,8-triaza-7,7,9,9-tetramethyl-2,4-dioxo-spiro[4.5]decane-8-oxyl | 920 |
| Cyclohexane-1-spiro-2'-(6',6'-dimethylpiperidine-1'-oxyl)-4'-spiro-5"-hydantoin | 840 |
| Commercially available stabilizer: 2,6-di-tert.-butyl-4-methylphenol | 480 |
| None | 360 |

It will be apparent from the results summarized in the above Tables I, II and III that the piperidine-N-oxyl-spiro-hydantoins (I) of this invention show excellent stabilizing action on the resinous polymer, especially polyolefin, against the photo-deterioration thereof, as compared with those known light stabilizers.

EXAMPLE 4

A low molecular weight polymer having terminal hydroxy groups (prepared by reaction of 2 moles of ε-caprolactone diol having a molecular weight of 1000 with 1 mole of 2,4-tolylene diisocyanate; 200 g.) was subjected to polymerization reaction with 46 g. of methylenebis-(4-phenylisocyanate) at 90° C. for 1 hour to produce a prepolymer.

The prepolymer thus produced was dissolved in 740 g. of dimethylformamide at room temperature. Then, to the resulting solution was added additional portion (50 g.) of dimethyl-formamide containing 1.7 g. of water. After adequately stirring, there is obtained a viscous solution, which was then divided into 5 portions of each approximately equal amount. The first and second portions of the solution were intimately admixed with the piperidine-N-oxyl-spiro-hydantoin of this invention specified in the following Table IV, which hydantoin being employed in an amount of 1% by weight based upon the weight of the prepolymer employed, respectively. As a control for comparative purpose, the third and fourth portions of the solution were intimately admixtured with the known stabilizers specified in the following Table IV in the same amount as above, respectively. The last one portion remained unmodified without addition of such stabilizer. Each portion of the stabilized solution was spun into a yarn of 280 denier by a standard wet spinning process in water at 40° C.

The yarn thus obtained was then tested for its light stability as set forth below. The test procedure was employed which involved exposure of the yarn to ultraviolet irradiation at 55° C. for 25 hours by means of the fademeter prescribed in the JIS L-1044-1959. The tensile strength and elongation of the yarn before and after exposure to ultraviolet irradiation were measured by means of a standard fiber tensile tester, "Tensilon" (the trade name of the portable fiber tensile tester manufactured and sold by Toyo Sokuki K.K, Japan). The ultimate tensile strength loss and ultimate elongation loss were determined by subtraction of the values after exposure from those before exposure, respectively. The color which might develop during and/or after ultraviolet irradiation was visually observed and recorded on each yarn.

The results are in the following Table IV.

TABLE IV

| Stabilizer | Ultimate tensile strength loss, percent | Ultimate elongation loss, percent | Color |
|---|---|---|---|
| Piperidine-N-oxyl-spiro-hydantoin of this invention: | | | |
| 1,3,8-triaza-7,7,9,9-tetramethyl-2,4-dioxo-spiro[4.5]decane-8-oxyl. | 6 | 4 | Unchanged. |
| Cyclohexane-1-spiro-2'-(6',6'-dimethylpiperidine-1'-oxyl)-4'-spiro-5''-hydantoin. | 8 | 7 | Do. |
| Commercially available stabilizer: | | | |
| 2-(2'-hydroxy-5'-methylphenyl)-benzotriazole | 48 | 47 | Yellow-colored. |
| 2-hydroxy-4-n-octoxybenzophenone | 50 | 45 | Do. |
| None | 85 | 81 | Brown-colored. |

It will be apparent from the above results that the piperidine-N-oxyl-spiro-hydantoins (I) of this invention exhibit high retentions of tensile strength and of elongation and, further, they are effective in the prevention of color development in the resinous polymer after exposure to light.

What is claimed is:

1. A resinous polymer being a polyolefin, an olefin copolymer or a polyurethane, stabilized against deterioration by light, wherein there is incorporated in the polymer, in an amount effective to prevent the deterioration, a compound having the formula

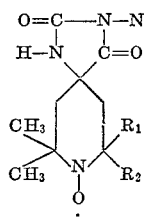

wherein $R_1$ and $R_2$ may be the same or different and represent alkyl or they may be joined together with the carbon atom to which they are attached to form a 5- or 6-membered saturated homocyclic ring or the group of the formula

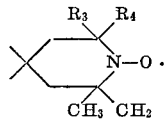

wherein $R_3$ and $R_4$ may be the same or different and represent an alkyl group.

2. The resinous polymer according to claim 1 wherein the said polyolefin is polyethylene or polypropylene.

3. The resinous polymer according to claim 1 wherein the said compound is selected from the group consisting of 1,3,8-triaza-7,7,9,9-tetramethyl-2,4-dioxo-spiro[4.5]decane-8-oxyl,
cyclohexane-1-spiro-2'-(6',6'-dimethylpiperidine-1'-oxyl)-4'-spiro-5''-hydantoin, and
(2,2,6,6-tetramethylpiperidine-1-oxyl)-4-spiro-2'-(6',6'-dimethylpiperidine-1-oxyl)-4'-spiro-5''-hydantoin.

4. The resinous polymer according to claim 1 wherein the polymer is a polyolefin and there is incorporated an amount of 0.01–0.2% by weight of a compound selected from the group consisting of 1,3,8-triaza-7,7,9,9-tetramethyl-2,4-dioxo-spiro[4.5]decane-8-oxyl,
cyclohexane-1-spiro-2'-(6',6'-dimethyl-piperidine-1'-oxyl)-4'-spiro-5''-hydantoin, and
(2,2,6,6-tetramethylpiperidine-1-oxyl)-4-spiro-2'-(6',6'-dimethylpiperidine-1-oxyl)-4'-spiro-5''-hydantoin.

5. The resinous polymer according to claim 1 wherein the polymer is a polyurethane and there is incorporated an amount of 0.01–10% by weight of a compound selected from the group consisting of 1,3,8-triaza-7,7,9,9-tetramethyl-2,4-dioxo-spiro[4.5]decane-8-oxyl,
cyclohexane-1-spiro-2'-(6',6'-dimethyl-piperidine-1'-oxyl)-4'-spiro-5''-hydantoin, and
(2,2,6,6-tetramethylpiperidine-1-oxyl)-4-spiro-2'-(6',6'-dimethylpiperidine-1-oxyl)-4'-spiro-5''-hydantoin.

References Cited

UNITED STATES PATENTS 3,313,819  4/1967  Griot _____ 260—294
3,334,103  8/1967  Feldman et al. _____ 260—290

DONALD E. CZAJA, Primary Examiner

R. A. WHITE, Assistant Examiner

U.S. Cl. X.R.

260—294